(No Model.)
J. P. ROE & P. R. BEDLINGTON.
APPARATUS FOR SUPPORTING AND GUIDING TRAVELING ROPES OR CABLES USED IN TRANSPORTING LOADS.
No. 347,443. Patented Aug. 17, 1886.
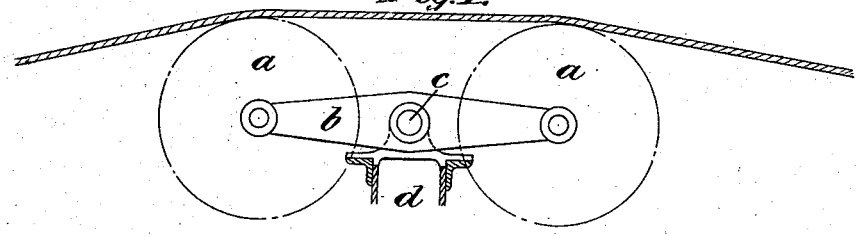
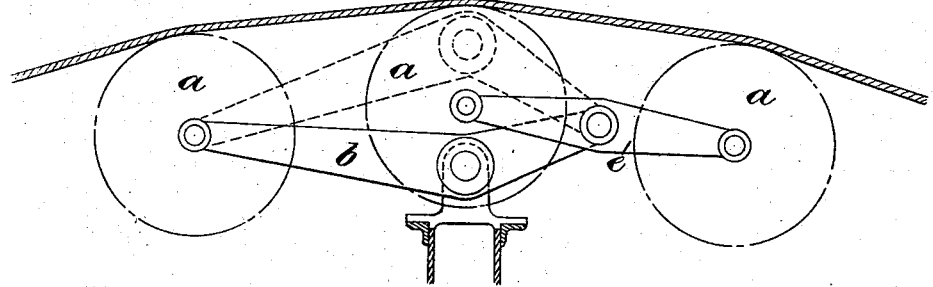
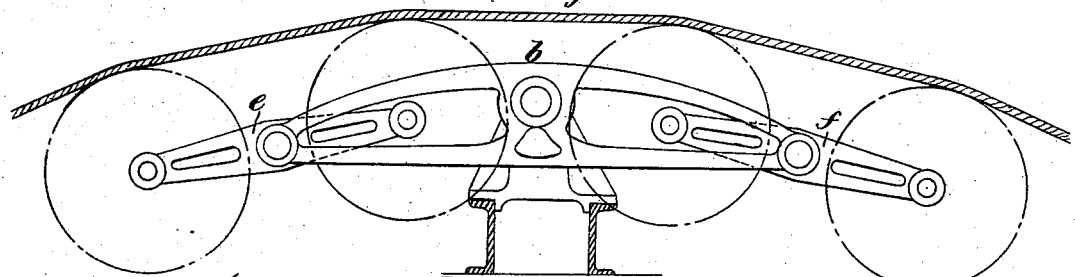
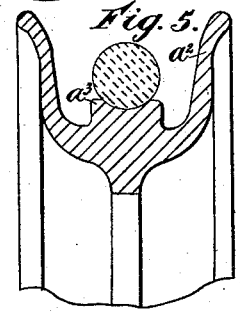
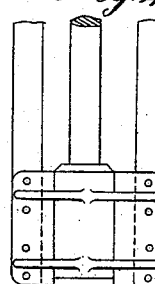
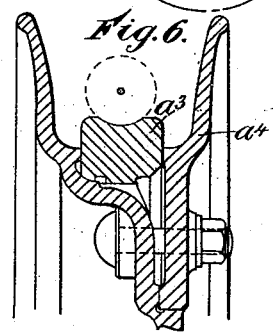
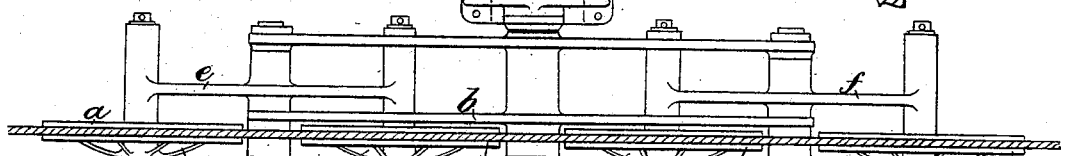
Witnesses
Geo H Shippich
U. W. Cook.
Inventors J. P. Roe and P. R. Bedlington
By their Atty's Curtis & Crocker
N. PETERS, Photo-Lithographer, Washington, D. C.

UNITED STATES PATENT OFFICE.

JOHN PEARCE ROE AND PETER ROE BEDLINGTON, OF BILBAO, SPAIN.

APPARATUS FOR SUPPORTING AND GUIDING TRAVELING ROPES OR CABLES USED IN TRANSPORTING LOADS.

SPECIFICATION forming part of Letters Patent No. 347,443, dated August 17, 1886.

Application filed April 10, 1885. Serial No. 161,793. (No model.) Patented in England January 2, 1884, No. 479; in France October 8, 1884, No. 164,690; in Germany October 19, 1884, No. 32,865, and in Spain May 29, 1885, No. 7,136.

*To all whom it may concern:*

Be it known that we, JOHN PEARCE ROE and PETER ROE BEDLINGTON, subjects of the Queen of Great Britain and Ireland, residing at Bilbao, in the Kingdom of Spain, have invented new and useful Improvements in Apparatus for Supporting and Guiding Traveling Ropes or Cables Used for Transporting Loads, (for which we have obtained Letters Patent in Great Britain, dated January 2, 1884, No. 479, granted in the name of William Lloyd Wise, as our agent and held in trust for us; in France by patent dated October 8, 1884, No. 164,690; in Germany by patent dated October 19, 1884, No. 32,865, and in Spain by patent dated May 29, 1885, No. 7,136,) of which the following is a specification.

This invention relates to improvements in apparatus for supporting and guiding traveling ropes or cables used for transporting loads to enable aerial cables to be used with gradients, curves, and spans, such as cannot be worked advantageously, if at all, with the apparatus ordinarily employed, and more particularly to avoid undue local stress upon the sheaves or pulleys and cable when working long spans, and to reduce the friction and strain upon the sheave-journals by avoiding overhang of the sheaves.

For the purpose of preventing undue local stress upon the sheaves and cable when working long spans, two, three, or more sheaves are arranged tandem fashion at the points where great pressure is experienced—as, for instance, at each end of a long span across a valley—the pressure being thus divided over several bearings, while the cable can run in a gentle curve following more or less the contour of the ground, thus rendering unnecessary the employment of high trestles. When a group of sheaves are thus arranged, they may have their bearings or journals mounted on the ends of balance-levers, to insure an equally-distributed strain on each and to automatically compensate for the constantly-varying positions of the loads upon the rope, as well as the changing weight of the load and the varying angles of deflection near the sheaves resulting therefrom. The sheaves may also be mounted upon springs or upon adjustable bearings, which can be fixed after the most favorable position has been found.

When a series of sheaves is used with compensating apparatus, these may be mounted in pairs on a lever, one at each end, and the lever pivoted to a frame or trestle, or it may in turn be connected to a second lever coupled at its other end to another pair of sheaves similarly carried, or each sheave may be on a separate lever, and the various levers be connected together, or three sheaves may be carried on two coupled levers. It is evident that the same object could be attained in many other different ways.

To reduce the friction and strain on the sheave-journals, and, in effect, avoid overhang, there are employed sheaves with dished arms or disks, so as to bring the main bearing under the line of the cable. The sheaves on which the cables travel are made with deep flanges and the rope-tread may be raised so as to give a considerable wearing depth, while presenting a comparatively small surface requiring to be turned up. The raised treads may be cast solid with the sheave-bodies or may be in the form of separate rings secured in place between the sheave-body and a removable flange.

In the accompanying sheet of illustrative drawings, Figures 1, 2, and 3 show in side view and Fig. 4 in plan or top view various ways of mounting the cable-pulley sheaves tandem fashion, as above mentioned. Fig. 1 shows two such sheaves, *a*, mounted at the ends of a balance or compensating lever, *b*, pivoted at *c* and carried by a support, *d*. In Fig. 2 the lever *b* carries at one end a sheave, while its other end forms a bearing for a second balanced or compensating lever, *e*, carrying a sheave, *a*, at each end, in all three sheaves, or by the introduction of another lever six sheaves may be carried.

In Figs. 3 and 4, *b* is a double lever or beam supporting at its ends the pivoted levers *e f*, which in turn carry the sheaves *a* at their ends, in all four sheaves, while by the introduction of another lever eight pulleys may be employed. The pulleys may be mounted in various other ways to attain the object in view without departing from the principle of this part of my invention. The sheaves $a$ are provided with dished arms $a'$ or with dished disks, for the purpose hereinbefore mentioned.

Fig. 5 is a sectional view of a portion of a sheave provided with deep flanges $a^2$ and a raised tread, $a^3$, cast solid with the sheave.

Fig. 6 is a similar view to Fig. 5, showing a sheave with deep flanges, provided with a separate raised tread, $a^3$, secured in place between the sheave-body and a removable flange, $a^4$.

We are aware that the United States Patents to O. H. Jadwin, No. 195,509, and to J. B. Low, No. 246,523, describe cars or vehicles running on a track and hauled by a traveling cable which is supported upon pulleys or sheaves carried on the ends of a balance-lever; but this is essentially different from my invention in that the traveling vehicle or load is not suspended from the cable or supported thereby in either Jadwin's or Low's apparatus, and the balanced pulleys simply act when gripping devices—"knots, swivels, or other bulky obstruction"—come along to tilt or dip at one end and allow the obstruction "to ride over with ease," whereas in our apparatus the traveling car or load is suspended from and supported by the moving cable, and the inclination of and strain on the cable is constantly varying according to the proximity of the load to the supporting-sheaves, and the balance or compensating levers enable the compound sheaves of each support to accommodate themselves to these varying angles and strains, which in long spans especially is very important.

We are also aware that German Patent No. 11,614 of 1879, describes vehicles running on a fixed or stationary supporting-cable (tragseil) or rods (stange) and hauled by a separate endless draw-cable, (zugseil,) the fixed cables being supported by balanced pulleys; but this construction is also essentially different from my invention, since the fixed supporting-cable (in the German patent) is merely the equivalent, and performs the function of the rails or track in Jadwin's or Low's apparatus, and a traveling or hauling cable is used besides, whereas in our apparatus the traveling cable supports as well as hauls the load and is liable to great variations in angle and strain. Therefore the combination of mechanical elements is essentially different, and the function performed by the balance supporting-pulleys, which adjust themselves to the changes in angle and strain and avoid the friction and injury which would result from causing a traveling cable to pass around sharp angles, is also different and more important in the case of our invention.

What we claim is—

1. The combination, in apparatus for transporting loads by means of aerial ropes or cables, with the traveling rope and the load suspended therefrom and supported thereby, of two or more supporting sheaves or pulleys arranged tandemwise and supported by a balance or compensating beam or lever, substantially as described.

2. In apparatus for transporting loads by means of ropes or cables, three or more supporting sheaves or pulleys arranged tandemwise and supported by a balance or compensating compound beam or lever, substantially as herein described, for the purpose set forth.

3. In apparatus for transporting loads by means of ropes or cables, two or more supporting sheaves or pulleys with dished arms or disks arranged tandemwise and supported by a balance or compensating beam or lever, (or beams or levers,) substantially as described, for the purposes set forth.

4. In apparatus for transporting loads by means of ropes or cables, two or more supporting sheaves or pulleys with deep flanges and raised or removable treads arranged tandemwise and supported by a balance or compensating beam or lever, (or beams or levers,) substantially as described, for the purposes set forth.

JOHN PEARCE ROE.
PETER ROE BEDLINGTON.

Witnesses:
THEODORO MENDIZABAL,
FERNANDO REMIMIDER.